United States Patent
Greathouse et al.

(10) Patent No.: US 9,652,543 B2
(45) Date of Patent: May 16, 2017

(54) TASK-ORIENTED PRESENTATION OF AUXILIARY CONTENT TO INCREASE USER INTERACTION PERFORMANCE

(71) Applicant: Microsoft Technology Licensing, LLC, Redmond, WA (US)

(72) Inventors: W. Earl Greathouse, Kirkland, WA (US); Meenaz Merchant, Kirkland, WA (US); Shannon Westphal, Seattle, WA (US); Patrick Haluptzok, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 387 days.

(21) Appl. No.: 14/580,214

(22) Filed: Dec. 22, 2014

(65) Prior Publication Data
US 2016/0179969 A1    Jun. 23, 2016

(51) Int. Cl.
G06F 7/00        (2006.01)
G06F 17/30       (2006.01)
G06Q 30/02       (2012.01)

(52) U.S. Cl.
CPC .... *G06F 17/30867* (2013.01); *G06F 17/3053* (2013.01); *G06F 17/30247* (2013.01); *G06F 17/30256* (2013.01); *G06F 17/30277* (2013.01); *G06F 17/30843* (2013.01); *G06F 17/30864* (2013.01); *G06Q 30/0251* (2013.01)

(58) Field of Classification Search
CPC ................................................ G06F 17/30843
See application file for complete search history.

(56) References Cited

U.S. PATENT DOCUMENTS

| | | |
|---|---|---|
| 8,406,573 B2 | 3/2013 | Wang et al. |
| 8,782,077 B1 | 7/2014 | Rowley et al. |
| 2010/0036883 A1 | 2/2010 | Valencia-Campo et al. |
| 2010/0088151 A1 | 4/2010 | Kim et al. |
| 2010/0169178 A1 | 7/2010 | Wang et al. |
| 2011/0010363 A1 | 1/2011 | Homma et al. |
| 2011/0106782 A1 | 5/2011 | Ke et al. |
| 2012/0179704 A1 | 7/2012 | Xu et al. |

(Continued)

OTHER PUBLICATIONS

Changsheng, et al., "Sensitivity Analysis of Neural Network Parameters for Advertising Images Detection", In Second International Workshop on Education Technology and Computer Science, vol. 3, Mar. 6, 2010, pp. 76-79.

(Continued)

*Primary Examiner* — Ajith Jacob
(74) *Attorney, Agent, or Firm* — The Watson IP Group, PLC; Vladan M. Vasiljevic (57) ABSTRACT

Auxiliary content provided in addition to search results is selected and presented to aid the user in completing tasks and increasing user interaction performance. Auxiliary content is processed utilizing existing search engine categorization and identification mechanisms, thereby facilitating the determination of similarities between the auxiliary content and indexed content that is identified as being responsive to a search query. At least some of the search results identified as being responsive to the search query are compared to auxiliary content to identify similarities, including visual similarities. Similar auxiliary content are selected to aid the user in completing tasks, and such selected auxiliary content is provided with the search results, including in a visually distinct or separated manner.

20 Claims, 5 Drawing Sheets

(56) References Cited

U.S. PATENT DOCUMENTS

2012/0239506 A1    9/2012    Saunders et al.
2013/0124303 A1    5/2013    Kassem

OTHER PUBLICATIONS

"Building a Better Shopping Experience", Published on: Jun. 3, 2012, Available at: http://googlecommerce.blogspot.in/2012/05/building-better-shopping-experience.html.

Yang, et al., "ContextSeer: Context Search and Recommendation at Query Time for Shared Consumer Photos", In Proceedings of the 16th International Conference on Multimedia, Oct. 26, 2008, 10 pages.

Lu, et al., "Contextual Image Search", In Proceedings of the 19th International Conference on Multimedia, Nov. 28, 2011, 10 pages.

Pan, et al., "Image Search by Graph-Based Label Propagation with Image Representation from DNN", In Proceedings of the 21st ACM international conference on Multimedia, Oct. 21, 2013, pp. 397-400.

Jiang, et al., "An Online Advertisement Platform Based on Image Content Bidding", In IEEE International Conference on Multimedia and Expo, Jun. 28, 2009, pp. 1234-1237.

Scott, et al., "Visiads: A Vision-Based Advertising Platform for Camera Phones", In IEEE International Conference on Multimedia and Expo, Jun. 28, 2009, pp. 1837-1838.

"Product Listing Ads", Published on: Aug. 3, 2012, Available at: http://www.google.ca/ads/innovations/productlistingads.html.

"Bing Introduces Product Search and New Ad Formats: What it means for Bing Ads Advertisers", Retrieved on: Sep. 18, 2014, Available at: http://advertise.bingads.microsoft.com/en-in/blogpost/127643/bing-ads-blog/bing-introduces-product-search-and-new-ad-formats-what-it-means-for-bing-ads-advertisers.

"New Image Extensions Enable You to "Show" and "Tell" with Search Ads", Published on: Jun. 9, 2013, Available at: http://adwords.blogspot.in/2013/06/new-image-extensions-enable-you-to-show.html.

Yonekawa, et al., "The Content-Based Image Retrieval using the Pulse Coupled Neural Network", In Proceedings of International Joint Conference on, Jun. 10, 2012, 8 pages.

Chung, et al., "The Impact of Images on User Clicks in Product Search", In Proceedings of the Twelfth International Workshop on Multimedia Data Mining, Aug. 12, 2012, pp. 25-33.

"International Search Report and Written Opinion Issued in PCT Application No. PCT/US2015/067235", Mailed Date: Mar. 17, 2016, 12 Pages.

TASK-ORIENTED PRESENTATION OF AUXILIARY CONTENT TO INCREASE USER INTERACTION PERFORMANCE

BACKGROUND

As network communications among multiple computing devices have become ubiquitous, the quantity of information available via such network communications has increased exponentially. For example, the ubiquitous Internet and World Wide Web comprise information sourced by a vast array of entities throughout the world, including corporations, universities, individuals and the like. Such information is often marked, or "tagged", in such a manner that it can be found, identified and indexed by services known as "search engines". Even information that is not optimized for search engine indexing can still be located by services, associated with search engines, which seek out information available through network communications with other computing devices and enable a search engine to index such information for subsequent retrieval.

Due to the sheer volume of information available to computing devices through network communications with other computing devices, users increasingly turn to search engines to find the information they seek. Search engines typically enable users to search for any topic and receive, from this vast volume of information, identifications of specific content that is deemed to be responsive to, or associated with, the users' queries. To sort through the vast amounts of information that is available, and timely provide useful responses to users' queries, search engines employ a myriad of mechanisms to optimize the identification and retrieval of responsive and associated information.

One such mechanism is the focusing of responsive content to specific forms, such as news content, image content, video content, or content limited to specific informational categories such as research papers, court decisions, governmental publications, and other like informational categories. Depending on the task being performed by a user, the focusing of responsive content to specific forms can be helpful to the user. For example, users searching for a particular item in order to determine what that item looks like can be better served by performing a search whose responsive content will be focused to one specific form, namely images. Indeed, image searching has become a popular utilization of search engines.

SUMMARY

Auxiliary content provided in addition to search results can be selected and presented to aid the user in completing tasks and increasing user interaction performance. Auxiliary content can be processed utilizing existing search engine categorization and identification mechanisms, thereby facilitating the determination of similarities between the auxiliary content and indexed content that is identified as being responsive to a search query. At least some of the search results identified as being responsive to the search query can be compared to auxiliary content to identify similarities, including visual similarities. Similar auxiliary content can be selected to aid the user in completing tasks, and such selected auxiliary content can be provided with the search results, including in a visually distinct or separated manner.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to improving users' interaction performance by providing auxiliary content, supplemental to search results, that aids user task completion. Search engines can provide search results in a myriad of formats, including textual search results, entity search results, image search results and the like. Users often select to receive search results in a specific format in order to accomplish a specific task beyond merely searching. For example, users often request image search results to identify a product to purchase since it is more natural for users to differentiate between products based on visual appearance. The provision of images search results by a search engine, however, may not enable a user to complete a purchase task. Auxiliary content can be presented, which is supplemental to the search results, and which can aid the user in completing a task beyond mere searching. Such auxiliary content can be processed utilizing existing search engine categorization and identification mechanisms, thereby facilitating the determination of similarities between available auxiliary content and indexed content that is identified as being responsive to a search query. Once results responsive to the user's search query are identified by the search engine, supplemental auxiliary content can be identified by finding auxiliary content that is similar, such as being visually similar, to those search results. The auxiliary content having determined similarities with the search results identified by the search engine, such as visual similarities, can be provided with the search results, including in a visually distinct or separated manner. As indicated, such auxiliary content can aid the user's task completion and increase and improve user interaction performance.

One specific difficulty, experienced by many users, that can be addressed through the provision of auxiliary content in the manner detailed below, is that image search results can be confusing or even misleading. For example, a webpage containing an image may be directed to, and may contain, content that is only tangentially related to the image. A user finding such an image through a search engine's image search feature, and then utilizing the search engine to access the webpage from which such an image was obtained, may find that, other than the image, the remaining content of the webpage is not helpful to the user in completing their task. As another example, a user searching for a particular item that the user wishes to purchase may utilize a search engine's image search feature because the image search results can be parsed more efficiently by the user to identify the specific item they wish to purchase. However, a webpage containing an image of the specific item that the user wishes to purchase may not provide any mechanisms for the user to actually purchase such an item. For example, such a webpage may be only an informational webpage, such as could be maintained by a manufacturer or designer of the item. As another example, a webpage with an image of the item the user wishes to purchase may be merely a webpage offering a review of such an item. A user, having utilized a search engine's image search feature to find an image of the specific item they wish to purchase can be disappointed when being directed to the webpage from which such an image was sourced because such a webpage does not offer the item for sale and, as such, hinders the user in the completion of their task The techniques described herein make reference to advertising contexts within which selection of information to present to a user is based, at least in part, upon an amount of money paid, such as by an advertiser, to have the information presented to a user. However, such descriptions are not meant to suggest a limitation of the described techniques to advertising or revenue-generating contexts. To the contrary, the described techniques are equally utilizable with any ranking or value-assigning mechanisms. Consequently, as utilized herein, the word "ranking" does not necessarily connote a monetary categorization, and, instead, simply means a priority ordering.

Additionally, the techniques and mechanisms described below are described within the context of image searches where the presented search results are images, or are represented by an image, such as videos being represented by a single image from the video. Consequently, the descriptions below make reference to visual similarities as a determining factor upon which presentation of information is, at least in part, based. Nevertheless, the techniques and mechanisms described are equally applicable to the presentation of any auxiliary content based upon determined similarities, including visual similarities. Consequently, references to images and similarities based on visual appearance are meant to be examples only, and do not represent any inherent limitations of the mechanisms described.

For purposes of illustration, the techniques described herein make reference to existing and known application user interface contexts, such as user interfaces typically presented by Web browsers. Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any application user interface including, for example, lifestyle and/or entertainment applications, such as audio and/or video presentation applications and electronic book readers, and other content consuming and presentation applications.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
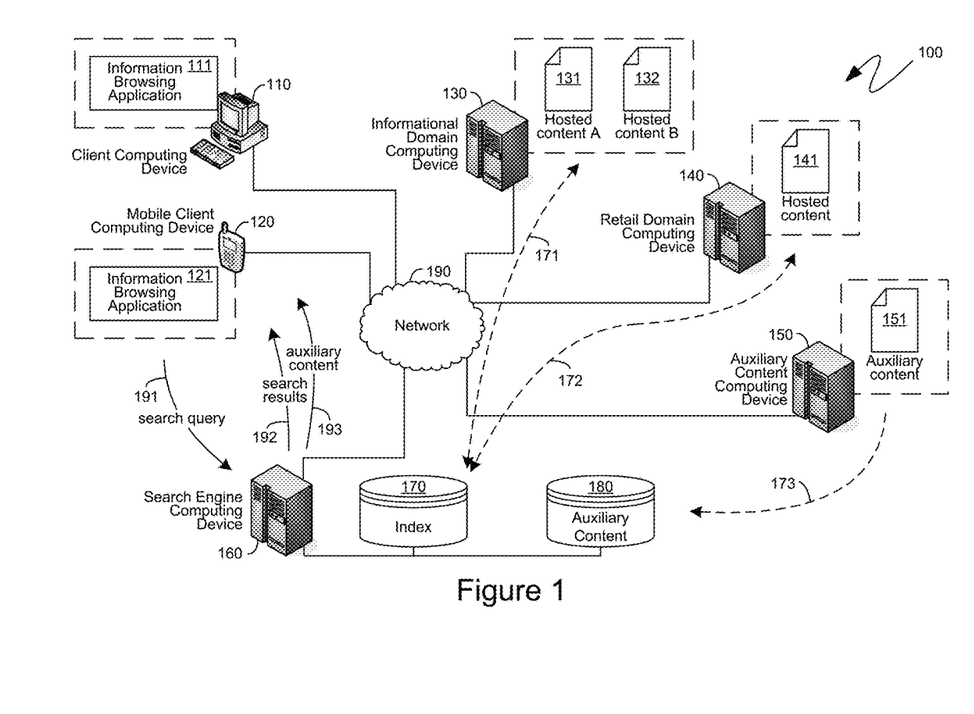
FIG. 1 is a block diagram of an exemplary system for providing task-oriented presentation of auxiliary content.

With reference to FIG. 1, an exemplary system 100 is illustrated, providing context for the descriptions below. The exemplary system 100 of FIG. 1 is shown as comprising a traditional desktop client computing device 110, and a mobile client computing device 120 that are both communicationally coupled to a network 190. The network 190 also has, communicationally coupled to it, a search engine computing device 160 that can provide search functionality to users of client computing devices, such as the client computing device 110 or the mobile client computing device 120. The illustration of the search engine computing device 160 as a single device is strictly for illustrative simplicity, and the descriptions below are equally applicable to processes executing on a single search engine computing device 160 or executing across multiple search engine computing devices, either in serial or in parallel, including on one or more virtual machine computing devices being executed on, and supported by, one or more physical computing devices.

The search engine computing device 160 can enable users of client computing devices to locate content accessible via the network 190. By way of example, an informational domain computing device 130 and a retail domain computing device 140 are exemplarily shown as being communicationally coupled to the network 190 to provide context for the descriptions below. The informational domain computing device 130 can comprise hosted content 131 and 132. According to one aspect, the informational domain computing device 130 can be a traditional Web server computing device hosting one or more webpages, which typically provide informational content in the form of textual content, image content and other like hypermedia and multimedia content. The retail domain computing device 140 can comprise hosted content 141 that can be dynamically generated based upon information retrieved by the retail domain computing device 140 from a retail database that can comprise inventory, pricing or other like retail information. The retail domain computing device 140 can be a computing device hosting a Web store or other like Web-based retail presence through which goods or services are sold. In such an instance, the hosted content 141 can represent a dynamically generated webpage, such as a webpage offering for sale a particular item and providing up-to-date information such as a current price of the item, whether or not the item is in stock, and other like information.

As will be recognized by those skilled in the art, in order to provide search functionality to users of client computing devices, the search engine computing device 160 can obtain information about the content available via the network 190, such as the content hosted by one or more of the computing devices 130 or 140. More specifically, the search engine computing device 160 can request, from the informational domain computing device 130, the retail domain computing device 140, and other like computing devices, communicationally coupled to the search engine computing device 160 via the network 190, the content hosted by such computing devices. For example, as illustrated by the communications 171, the search engine computing device 160 can obtain the exemplary hosted content 131 and 132 from the informational domain computing device 130 and can organize the information contained in such hosted content into an index, such as exemplary index 170, that the search engine computing device 160 can subsequently utilize to efficiently identify hosted content responsive to, or of relevance to, a search query. In a similar manner, the search engine computing device 160 can obtain the exemplary hosted content 141, from the retail domain computing device 140, and index the information contained within such hosted content into the index 170, as illustrated by the communications 172. As will be recognized by those skilled in the art, exemplary communications 171 and 172 can represent what is typically referred to as "crawling" the network 190 for information being hosted by computing devices that are communicationally coupled to the network 190. In such a manner, the search engine computing device 160 can assemble an index 170 that can enable the search engine computing device 160 to efficiently identify information, hosted by one or more computing devices that are communicationally coupled to the network 190, that is responsive to a search query directed to the search engine computing device 160.

According to one aspect, in addition to the index 170, the search engine computing device 160 can have access to auxiliary content 180. More specifically, auxiliary content, such as the exemplary auxiliary content 151, can be explicitly provided to the search engine computing device 160, such as by the exemplary auxiliary content computing device 150, so that the auxiliary content 151 can be presented in supplement to search results generated by the search engine computing device 160. As one specific, illustrative example, the auxiliary content 151 can be advertising content, such as an advertisement that an advertiser, such as an advertiser operating the auxiliary content computing device 150, desires to have displayed along with the search results generated by the search engine computing device 160. As indicated previously, however, advertising is but one example of contemplated auxiliary content.

As will be described in further detail below, auxiliary content, such as exemplary auxiliary content 151, can be stored in an auxiliary content store 180. According to one aspect, auxiliary content can be processed in a manner analogous to content that is indexed into the index 170, thereby facilitating identification of similarities between content from the index 170, identified by the search engine computing device 160 as being responsive to a query, and auxiliary content, from the auxiliary content store 180. The provision of the auxiliary content 151, by the auxiliary content computing device 150, to the search engine computing device 160, and the subsequent processing and storage thereof into the auxiliary content store 180, is represented by communications 173 shown in FIG. 1.

Turning to the exemplary client computing device 110 and exemplary mobile client computing device 120, both are illustrated as comprising information browsing applications, namely the exemplary information browsing applications 111 and 121, respectively. The exemplary client computing device 110 and the exemplary mobile client computing device 120 are both shown to illustrate that the mechanisms described below are equally applicable to mobile computing devices, including laptop computing devices, tablet computing devices, smartphone computing devices, and other like mobile computing devices, as well as to the ubiquitous desktop computing devices. For purposes of the descriptions below, references to the information browsing application 111 executing on the client computing device 110 are intended to be equally applicable to the information browsing application 121 executing on the mobile client computing device 120, and vice versa. According to one aspect, the information browsing application 111, or the information browsing application 121, can be the ubiquitous web browser that can retrieve and display information in the form of websites that are hosted by web servers communicationally coupled to the network 190, such as those described above. However, as indicated previously, the mechanisms described below are not limited to World Wide Web-based environments. Thus, for example, the information browsing applications 111 and 121, can be other types of information browsing applications including, for example, e-book readers, universal document format readers, or even content creation applications, such as word processors, spreadsheets, presentation applications, and e-mail applications. Yet another type of information browsing application can be an operating system itself, including, for example, operating systems comprising support for known networking protocols for the receipt and presentation of information and operating systems comprising information browsing components or built-in or included information browsing applications.

A user of the client computing device, such as the client computing device 110 or the mobile client computing device 120, can utilize the search functionality provided by the search engine computing device 160 by submitting a search query, such as the exemplary search query 191, to the search engine computing device 160. As will be recognized by those skilled in the art, such a search query can represent information, including textual information, images, audio, and other like multimedia and hypermedia content, about which the user desires to obtain additional information from among the content available via the network 190. In response to the search query 191, the search engine computing device 160 can provide an identification of documents, or other like hosted content, that comprise content deemed relevant to the search query. Such identification of documents is typically in the form of web links to such documents and such documents are typically in the form of webpages. As will also be recognized by those skilled in the art, such an identification of documents, or other hosted content, is typically referred to as search results, such as exemplary search results 192, that can be provided in response to the search query 191.

In addition to the search results 192, and as will be described in greater detail below, specific ones of the auxiliary content, available from the auxiliary content store 180, can be provided to a user in response to the search query 191. Such auxiliary content is illustrated as the exemplary auxiliary content 193, shown in FIG. 1 is being provided with the search results 192 in response to the search query 191. According to one aspect, auxiliary content, such as exemplary auxiliary content 193, that is provided with search results, such as exemplary search results 192, can increase user interaction performance, such as with the search engine hosted by the search engine computing device 160, by facilitating the user's performance of tasks.

By way of a specific example, a user looking to purchase a particular product can generate a search query 191 comprising the name of such a product, or other like identifying information about the product. In response, the user can receive search results, such as exemplary search results 192, that can comprise information, deemed by the search engine being hosted by the search engine computing device 160 to be responsive to the user's search query, where such information is available through the network 190. Often, as indicated above, a user seeking to purchase a specific product can request that the search results 192 be in the form of image search results, since it can be easier for the user to visually identify the specific product, such as by viewing images, rather than attempt to decipher text-based search results to determine whether the search results provided are referring to the specific product the user was interested in purchasing. As will be recognized by those skilled in the art, image search results can return a collection of images obtained from hosted content that is hosted by computing devices communicationally coupled to the network 190. As such, a user selecting one image, from among the image search results, can be provided with the option to retrieve the hosted content comprising such an image. Within the context of the Internet and the World Wide Web, a user selecting one image, from among the image search results, can be provided with the option to "visit" the webpage comprising such an image. However, the webpage comprising the selected image may not offer the user the opportunity to purchase the product shown in the image, or otherwise complete the task the user desires to complete. For example, if the image, from the image search results 192, that the user selected is hosted by the informational domain computing device 130, selection of such an image can cause the user to access hosted content, such as exemplary hosted content 131 or 132, that can comprise information about the specific product the user sought to purchase, including, for example, images of such a product, one of which can have been the image the user saw as part of the image search results 192. However, user access of the content hosted by the informational computing device 130 does not aid the user in their task of purchasing the product, and results in user frustration and decreased user interaction performance.

According to one aspect, therefore, the auxiliary content 193 provided with the search results 192 can aid the user in performing tasks, and can increase user interaction performance. More specifically, and with reference to the above specific example of a user seeking to purchase a particular product, the auxiliary content 193 can provide the user with additional images, in supplement to the image search results 192, where the additional images of the auxiliary content 193 can be visually similar to at least some of the image search results 192. User selection of one of the images of the auxiliary content 193 can, then, direct the user to hosted content that can facilitate the user's completion of their task. For example, the exemplary auxiliary content 151 can be an advertisement to purchase products at a store represented by the retail domain computing device 140. An image associated with the exemplary auxiliary content 151 can be presented as part of the auxiliary content 193 in supplement to the image search results 192, such as, for example, if such an image is visually similar to one or more of the images presented in the image search results 192. User selection of such an image, from the auxiliary content 193, can direct the user to, for example, the exemplary hosted content 141, which as indicated previously, can be a webpage offering a particular product or service for sale. In the present example, the exemplary hosted content 141 can offer for sale the specific item that the user sought to purchase. In such a manner, and as will be detailed further below, the auxiliary content 193, provided with the image search results 192, aided the user in performing their task, thereby increasing user interaction performance.

Figure 2:
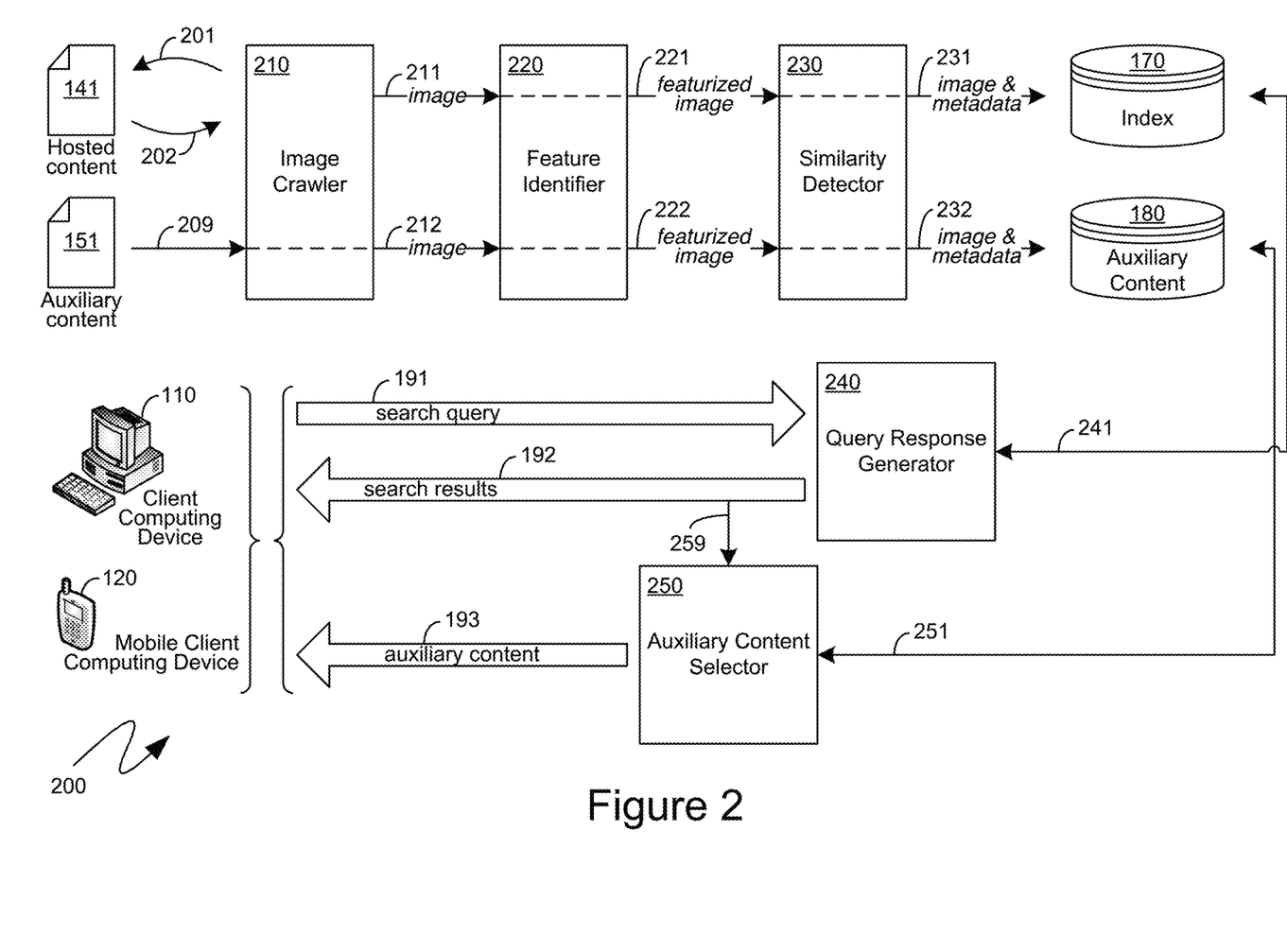
FIG. 2 is a block diagram of exemplary components for providing task-oriented presentation of auxiliary content.

Turning to FIG. 2, the exemplary system 200 shown therein illustrates an exemplary mechanism by which auxiliary content can be presented in supplement to search results, such as image search results. As indicated previously, according to one aspect, hosted content, such as exemplary hosted content 141, can be "crawled" by a search engine, or by other processes on behalf of the search engine, in order to identify and catalog content available over a network that can be searched by the search engine. One component that can perform such "crawling" can be an image crawler, such as the exemplary image crawler 210, that can retrieve, such as from the hosted content 141, images that are part of the hosted content 141. Exemplary communications 201 and 202 illustrate the request, and subsequent retrieval, of at least a portion of the hosted content 141 such as, for example, images present in the exemplary hosted content 141. According to one aspect, the exemplary image crawler 210 can provide images, such as is illustrated by the communication 211, to a feature identifier component, such as exemplary feature identifier component 220.

More specifically, according to such an aspect, the exemplary feature identifier component 220 can identify graphical portions, variations or aspects of the image provided by the communication 211 that can represent physical, visible features of the subject of such an image. The features identified by the feature identifier component 220 can be utilized to identify common subjects that are represented slightly differently in two or more images, thereby enabling the images to be grouped together and recognized as images of a common subject.

One mechanism that the feature identifier component 220 can utilize to identify features can be existing models of common image subjects. Such models can have been generated for common image search terms, or common image subjects that are searched for. Such models can define identified features for those image subjects, and the feature identifier component 220 can compare the image provided by the communication 211 to those identified features in order to identify corresponding features, if any, in the image provided by the communication 211.

An image, with information identifying features therein, can then be provided by the feature identifier component 220 to a similarity detector component 230, as illustrated by the exemplary communication 221. The similarity detector component 230 can then attempt to categorize, or classify, the image based on its similarity to other images, with such similarity being indicative of the image having a common subject with those other images. For example, a nearest neighbor matching algorithm can be utilized, such as by the similarity detector 230, to compare the image provided by the communication 221 to known images in order to identify visual similarities between the image provided by the communication 221 and those known images.

Upon completion of the processing by the image crawler component 210, the feature identifier component 220, and similarity detector component 230, a representation of the image, the image itself, metadata about the image, or combinations thereof can be stored into the index 170, as illustrated by the communication 231. As stored in the index 170, information regarding the image can be utilized, such as by the query response generator component 240, to efficiently identify images that can be provided as the search results 192 to a search query 191. As such, the processing performed by the image crawler component 210, the feature identifier component 220, and the similarity detector component 230 can identify, catalog, organize and associate images in accordance with visual similarities, similarities of subject matter, and other like associations. Although illustrated in the exemplary system 200 of FIG. 2 as separate components, those of skill in the art will recognize that the image crawler component 210, the feature identifier component 220, and the similarity detector component 230, are illustrated as separate components only for ease of explanation and reference, and not as an indication of distinct process boundaries of the computer-executable instructions performing such functionality.

According to one aspect, the image crawler component 210, the feature identifier component 220, and the similarity detector component 230 can represent existing functionality that can already have been utilized, such as by a search engine, to build an index 170 comprising information regarding images available through network communications, where such an index 170 can be utilized to generate image search results, such as exemplary image search results 192, in response to an image search query, such as exemplary image search query 191. In accordance with such an aspect, such existing functionality can be leveraged to process images associated with auxiliary content, such as the exemplary auxiliary content 151, in the same manner. More specifically, and as illustrated by the exemplary communications 209, 212, 222 and 232, images from auxiliary content, such as exemplary auxiliary content 151, can be fed through the same image processing pipeline as images obtained by "crawling" the network, with one exception being that the auxiliary content, such as the exemplary auxiliary content 151, can have been provided directly to the image crawler component 210, instead of having been "crawled for" by the image crawler component 210. In such a manner, images from the auxiliary content, as stored in the auxiliary content store 180, can have been processed in the same manner as the images referenced by the index 170, thereby facilitating comparisons between the images stored in the auxiliary content store 180 and those referenced by the index 170. For example, images from auxiliary content can have been compared to the same models as images referenced by the index 170, and the results of those comparisons can facilitate identification of visually equivalent images.

The image processing performed by the image crawler component 210, feature identifier component 220, and similarity detector component 230 can build and maintain the index 170 and the auxiliary content store 180, which can then be referenced upon receipt of a search query, such as from one or more of the client computing device, such as the exemplary client computing devices 110 and 120. More specifically, and as illustrated by the exemplary system 200 of FIG. 2, a search query, such as exemplary search query 191, can be received by a query response generator 240, which can reference the index 170, as illustrated by the communications 241, and, in a manner known to those skilled in the art, identify content, referenced by the index 170, that is deemed to be responsive to the search query 191. Such identified content can be returned in the form of search results, such as exemplary search results 192. More specifically, if the exemplary search query 191 is an image search query, then the exemplary search results 192 can return one or more images that the query response generator 240 has identified as being responsive to the image search query 191.

According to one aspect, the identified images that are provided as the image search results 192 can also be obtained by an auxiliary content selector component 250, such as is illustrated by the exemplary communication 259. The auxiliary content selector component 250 can then reference the auxiliary content store 180, as illustrated by the communications 251, to identify images, from among the auxiliary content catalogued by the auxiliary content store 180, that are visually similar to at least some of the exemplary image search results 192. As indicated previously, such visual similarity can be determined with reference to features defined by pre-generated models of commonly searched-for image subjects. For example, a model of a particular type of digital camera can have hundreds or thousands of features identified. Images of such a specific digital camera can be defined within a multidimensional space, with each dimension being associated with one of the identified features. In such a multidimensional space, the definition of the image of such a specific digital camera can be a multidimensional point whose coordinates represent a measurement of similarity, or difference, along each identified feature as a separate dimension. The proximity of two or more images within such a multidimensional space can be utilized to determine visual similarity, with images having a shorter distance between them, within the multidimensional space, having greater visual similarity than images having a greater distance between them, within the multidimensional space.

The auxiliary content selector component 250 can utilize such determinations of visual similarity to identify images, from among the auxiliary content catalogued in the auxiliary content store 180, that are visually similar to at least some of the images identified by the exemplary image search results 192. The auxiliary content corresponding to such images identified by the auxiliary content selector component 250 can then be provided, in the form of the exemplary auxiliary content 193, to supplement the exemplary image search results 192. As described previously, and as will be detailed further below with reference to FIG. 3, the provision of such auxiliary content, such as the exemplary auxiliary content 193, supplementing the image search results, can aid the user in performing tasks, and can increase user interaction performance.

Although illustrated as a single exchange in the exemplary system 200 of FIG. 2, the provision of auxiliary content, such as exemplary auxiliary content 193, in response to a search query, such as exemplary search query 191, can be part of an iterative searching process. More specifically, an initial search query can result in an initial set of search results, which, in the context of image search results, can include visually different images all of which were deemed, such as by the exemplary query response generator 240, to have been responsive to such query. A subsequent search query can then be generated by the user's selection of one specific image from among the search results that were provided to the preceding search query. For example, user searching for a "digital camera" can receive image search results depicting many different types of digital cameras. User selection of one such image can be treated as a subsequent search query, with the resulting image search results being limited to images that the very response generator 240 deemed to be equivalents to the user selected image.

The auxiliary content provided with such search results, such as exemplary auxiliary content 193, can, correspondingly, be updated as the search results 192 are updated. Thus, for example, the auxiliary content 193, provided with the search results 192, in response to an initial search query 191, can include auxiliary content that is visually similar to one or more of the images returned by the image search results 192, such as, for example, being visually similar to those images, returned by the image search results 192, that are deemed to be most relevant by the query response generator 240. A subsequent user selection of one of the images from the image search results can result in a new query, which can result in updated image search results, as described, and can also result in updated auxiliary content being provided by the exhilarating content selector 250. Such updated auxiliary content can be visually equivalent to at least one of the images provided as part of the updated image search results. However, as indicated previously, user selection of one image, from among image search results, can generate a search query whose corresponding image search results our visually similar the user-selected image. Thus, the auxiliary content provided by easily content selector 250 can be visually similar to the updated image search results, which, as indicated, can be visually similar to the user selected image. Consequently, the exemplary search query 191 illustrated in the exemplary system 200 of FIG. 2 is meant to represent any type of image search query, including initial search queries, and subsequent, refining search queries generated when a user selects one of the image search results returned in response to a prior image search query.

Figure 3:
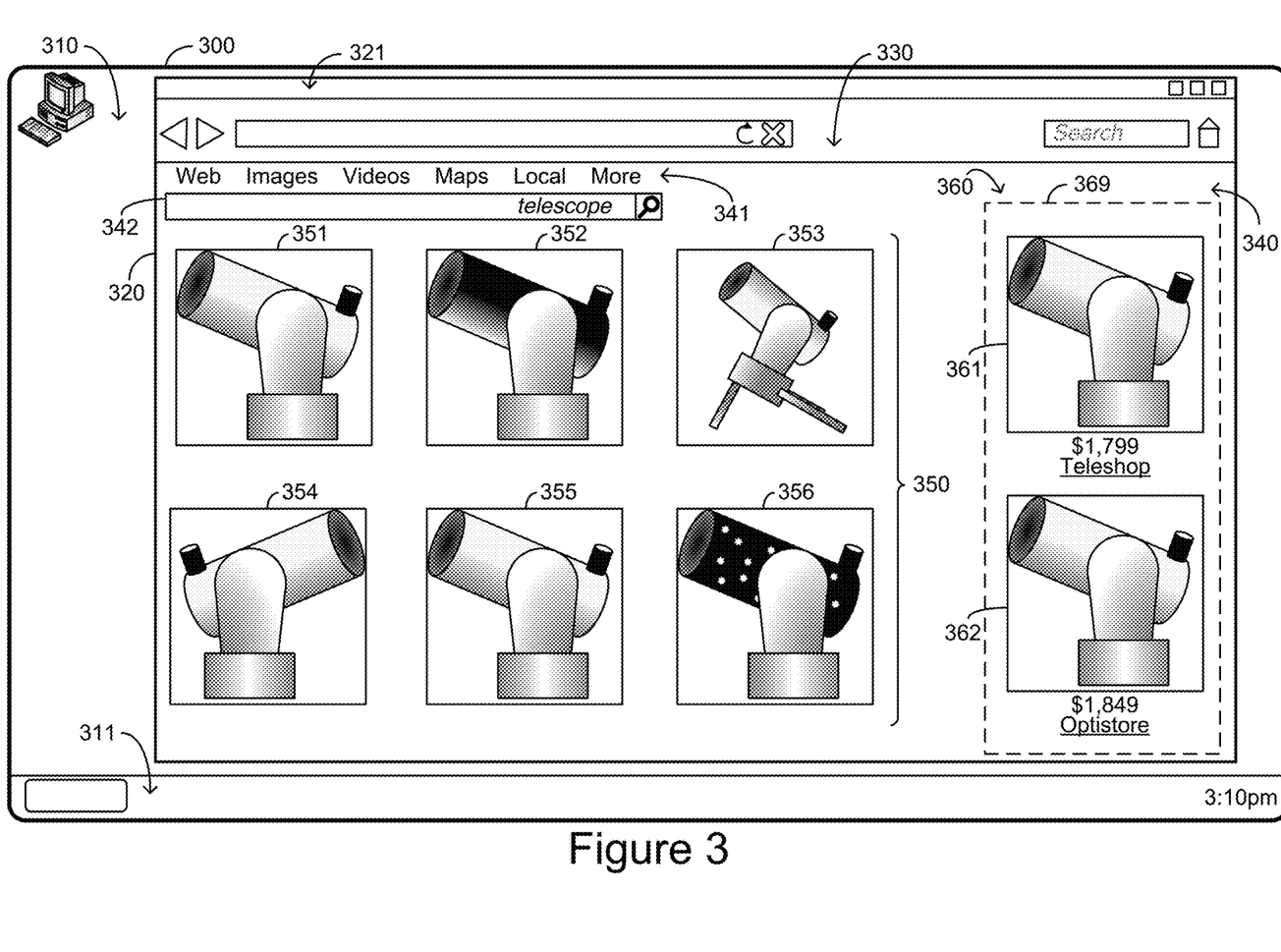
FIG. 3 is a diagram of an exemplary user interface providing task-oriented auxiliary content.

Turning to FIG. 3, an exemplary user interface 300 is shown, exemplarily comprising a desktop 310 within which an application window 320 is presented. Although illustrated within the context of a desktop user interface, the mechanisms described, and user interface elements described, are equally applicable to other graphical user interface environments, including touch-based input computing devices, such as tablets and smartphones, as well as to conventional desktop or laptop computing devices. In conjunction with the desktop 310, the exemplary user interface 300 of FIG. 3 can also comprise a taskbar 311. The application window 320 can be presented by an information browsing application, such as those described above, which can receive image search results in response to a user's search query. The application window 320 can comprise a window control area 321 with which the appearance of the window 320 within the user interface 300 can be controlled.

User selection of content can, in one embodiment, be controlled through a toolbar area 330, which can comprise mechanisms by which users can directly specify content, such as through content resource locators or other like content identifiers, mechanisms by which users can browse through content that was previously viewed, and other like content control mechanisms. The content itself can be displayed in a content presentation area 340 which, in the exemplary user interface 300 illustrated in FIG. 3, can comprise image search results content received from a search engine. Within the context of the exemplary user interface 300, the search engine can display selectors 341 within the content presentation area 350 that can, exemplarily, allow users to focus their search on images, videos, locations and the like. For purposes of the exemplary user interface 300 illustrated in FIG. 3, the exemplary image search results 350 can be a result of a user entering a search query, such as via the search query entry area 342, as well as having directed the search specifically to images, such as through the selectors 341.

By way of a specific example, the exemplary user interface 300, shown in FIG. 3, illustrates exemplary image search results 350 that can have been received in response to a user search query directed to a particular telescope. As indicated previously, a user may perform an image search for a specific item, such as for a particular telescope, because the user seeks to purchase such an item, and an image search provides the user with an efficient mechanism for distinguishing among different variants or options, in finding the specific item the user desires to purchase. For example, a user, in reviewing the exemplary image search results 350, can identify the telescope shown in the exemplary image search result 351 as the telescope the user wishes to purchase. By contrast, the user can efficiently review the exemplary image search results 350 to determine that, for example, the telescope shown in the exemplary image search result 352 is a different color than that sought by the user and the telescopes shown in the exemplary image search results 353 and 356 comprise accessories, such as a tripod or starmap dew shield, respectively, that the user does not desire.

Continuing with the above, specific example, a user identifying the telescope shown in the exemplary image search result 351 as the telescope that the user wishes to purchase, can select the exemplary image search result 351 and, in a manner known to those skilled in the art, can be directed to a larger version of the image, the opportunity to visit the webpage, or otherwise retrieve hosted content comprising a version of the image, or combinations thereof. Such a response to the user's selection of the exemplary image search result 351 can be confusing and can reduce user interaction performance. More specifically, a user seeking to purchase the specific telescope shown via the image search result 351 can be confused when selection of the image search result 351 only causes a presentation of a larger image. Even if the user were to be able to navigate to, for example, a webpage comprising the image identified by the exemplary image search result 351, such a webpage may not, in fact, offer such a telescope for sale. For example, such a webpage can be an informational webpage, such as that maintained by a manufacturer of the telescope, which can provide descriptions and specifications of the telescope, but may not enable the user to actually purchase the telescope. The user, thereby, remains frustrated in their attempt to complete a task, namely the purchase of a specific telescope, and their interaction performance decreases. By way of a further example, selection of another image search result that appears to be visually similar to the exemplary image search result 351, such as exemplary image search result 355, can yield the same negative user experience. For example, the exemplary image search result 355 can reference an image that can be hosted by a review website, which still does not offer the specific telescope for sale. In a like manner, the exemplary image search result 354, which can, for example, illustrate the same telescope as the exemplary image search results 351 and 355, except from a different perspective, or under different circumstances or surroundings, can, likewise, ultimately direct the user to a webpage that does not offer the telescope for sale.

According to one aspect, therefore, auxiliary content can be presented to supplement image search results such as, for example, the exemplary image search results 350 shown in the exemplary user interface 300. The auxiliary content can be presented in a manner that visually distinguishes it from the exemplary image search results 350. For example, the auxiliary content can be presented in a separate portion of the display area 340 such as, for example, in the display area portion 369. As another example, the auxiliary content can be presented in a portion of the display area 340 having a differently colored background, or otherwise being visually delineated through borders, background colors, differences in presentation, and other like visual delineations.

As indicated previously, the auxiliary content that can be presented can comprise images that are visually similar to images identified as part of the image search results 350. For example, as illustrated by the exemplary user interface 300 in FIG. 3, the auxiliary content 360, such as the exemplary auxiliary content 361 and 362, can comprise images that are visually similar to the image search results 351 and 355. According to one aspect, the image search results 350 can be ranked such that the most relevant image search results are presented first. According to such an aspect, the exemplary image search result 351 can be the most relevant image search result and, correspondingly, the auxiliary content 360 can comprise images that are visually similar to the image search result 351. According to other aspects, auxiliary content, such as the exemplary auxiliary content 361 and 362, can comprise images that are visually similar to multiple ones of the image search results 350, such as the highest ranked image search results.

The auxiliary content 360, such as the exemplary auxiliary content 361 and 362, can comprise advertisements, or other auxiliary content that can aid the user in performing a desired task. For example, returning to the above specific example where the user sought to purchase a telescope, the exemplary auxiliary content 361 and 362 can comprise advertisements from retailers selling the telescopes shown in the images of the auxiliary content 361 and 362. Additionally, by way of example, and as exemplarily illustrated in FIG. 3, the auxiliary content can comprise other information such as, for example, a sales price, a link to the advertised retailer's webpage, or other like information. A user selecting one of the auxiliary content, such as the exemplary auxiliary content 361 or 362, can be directed to an advertising retailer's webpage, from which the user can directly purchase the selected telescope. The auxiliary content 360, thereby, can aid the user in the performance of tasks and can, thereby, increase user interaction performance.

As indicated previously, the auxiliary content 360 can change in accordance with updated image search results 350. Thus, for example, and with reference to the specific example illustrated in FIG. 3, if the user had decided that the telescope that they wished to purchase looked like the one represented by the image search result 356, the user can have selected the image search result 356 as the query for a subsequent image search. Is will be recognized by those skilled in the art, in such an instance, updated image search results 350 could comprise image search results that all appear visually similar to the image search result 356, or are otherwise associated with the image search result 356. Analogously, auxiliary content 360 that can be presented to supplement such updated image search results 350 can, likewise, comprise a visual similarity to the image search result 356. Thus, for example, the exemplary auxiliary content 361 and 362 can be updated such that the auxiliary content that is presented comprises, or is otherwise associated with, images that are visually similar to the image search result 356. In such a manner, as a user iteratively interacts with the image search results 350, receiving updated image search results, the auxiliary content 360 can, likewise, be updated accordingly.

Figure 4:
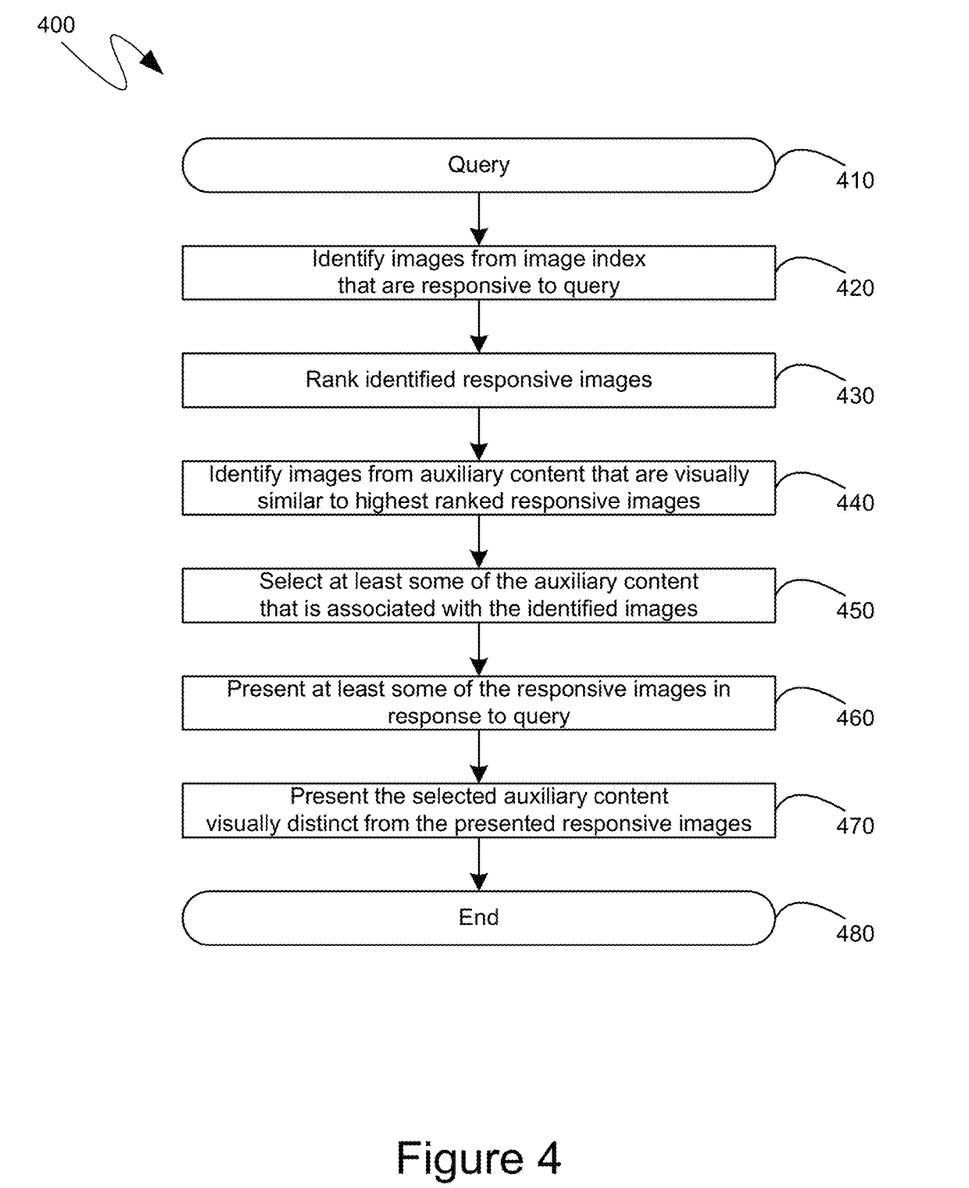
FIG. 4 is a flow diagram of an exemplary identification and provision of task-oriented auxiliary content.

Turning to FIG. 4, the exemplary flow diagram 400 shown therein illustrates an exemplary series of steps for providing auxiliary content that is visually similar to provided image search results. More specifically, at step 410, an image query can be received. As indicated previously, the image query, received at step 410, can be part of an iterative process, where the query, received at step 410, can be a selection of an image from among the responsive images that were presented to a user in response to a prior query, such as at step 460, during a prior iteration of the steps of the exemplary flow diagram 400. Once an image query is received, at step 410, images from an image index that are responsive to the query can be selected at step 420. As will be recognized by those skilled in the art, a myriad of mechanisms exist for identifying image search results that are responsive to a query, and any one or more such mechanisms can be equally utilized within the context of the descriptions provided herein. At step 430, the images selected, at step 420, as being responsive to the query can be ranked in order of relevance to the query. As will also be recognized by those skilled in the art, depending on the mechanisms utilized to identify and select response of images, at step 420, such selection can entail the ranking of the selected images at step 430, thereby, in effect, collapsing step 430 into step 420.

Once responsive images have been selected, such as at step 420, images from auxiliary content, that are visually similar to at least some of the images that were selected at step 420, can be identified at step 440. According to one aspect, and as described in detail above, the identification of images from auxiliary content, that are visually similar to images identified as being responsive to a query, can occur with reference to determined image features. More specifically, image features can be represented by values in a multidimensional space, where each dimension represents a defined feature of a model being utilized to evaluate the visual similarity of images. Two or more images having a lesser distance between them, within the multidimensional image space, can be considered to be more visually similar than images having a greater distance between them, within the multidimensional image space.

Once visually similar images from the auxiliary content are identified, at step 440, auxiliary content associated with at least some of the identified images can be selected at step 450. The selection of auxiliary content, at step 450, can be based on auxiliary content metadata or other factors beyond the visual similarity of the images of the auxiliary content that were identified at step 440. For example, the selection of auxiliary content, at step 450, can be based on a value to be received if such auxiliary content is presented. As another example, the selection of auxiliary content, at step 450, can be based on a determination of a task that the user seeks to perform. As yet another example, the selection of auxiliary content, at step 450, can be based on information associated with a user submitting the query received at step 410. For example, the user's geographic locations can be utilized to select the auxiliary content, such as at step 450, with auxiliary content having greater relevance to the user, based on the user's geographic location, being selected to the exclusion of other non-geographically impactful auxiliary content. Prior queries submitted by the user can, likewise, be utilized to inform the selection of auxiliary content, such as at step 450.

In such examples, to protect users' privacy, users would be required to take one or more affirmative actions before their personal information could be collected and stored or utilized, and, in the absence of such affirmative action, their personal information would not be collected or utilized.

From the users' perspective, there can be meaningful benefits to allowing access to some discrete portion of their personal information. For example, users may allow access to personal information simply because they desire more targeted and applicable auxiliary information. As another example, users can be provided with additional services, or benefits, in exchange for providing, or allowing access to, some of their personal information. As yet another example, users can be compensated, either monetarily or through products and services, in exchange for providing, or allowing access to, some of their personal information.

Once auxiliary content is selected, at step 450, at least some of the selected responsive images can be presented, in response to the query, at step 460. To supplement the response of images, presented at step 460, the auxiliary content, which was selected at step 450, can be presented at step 470. As described above, the presentation of selected auxiliary content, such as at step 470, can occur in a visually distinct manner from the presentation of the responsive images at step 460. The relevant processing can then end at step 480.

Figure 5:
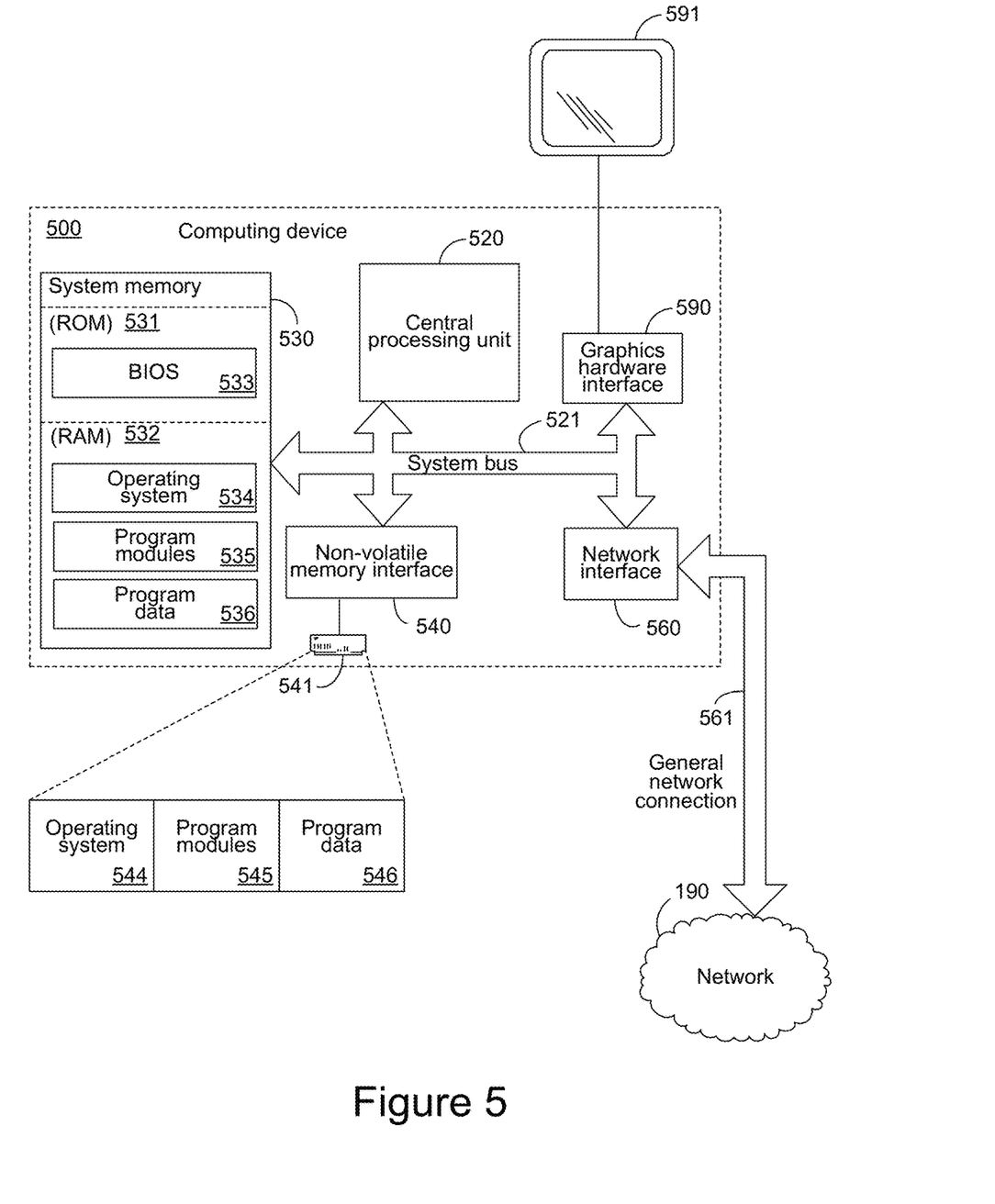
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 590 and a display device 591, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. Computer storage media, however, does not include communication media. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 536. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executed within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method increasing user interaction performance through the presentation of auxiliary content, the method comprising the steps of: receiving a search query; identifying images that are responsive to the search query from images that were indexed by crawling network-accessible content; identifying images, from auxiliary content, that are each visually similar to a first image of the responsive images, the auxiliary content differing from the network-accessible content that was crawled; providing at least some of the responsive images as a response to the search query; and providing, also as part of the response to the search query, but displayed visually separately from the provided responsive images, at least some of the auxiliary content that comprises the identified auxiliary content images.

A second example is the method of the first example, further comprising the steps of: identifying images from the auxiliary content that are each visually similar to a second image of the responsive images, the second image differing from the first image; and providing at least some of the auxiliary content that comprises the identified auxiliary content images that were identified as being visually similar to the second image of the responsive images.

A third example is the method of the first example, wherein the first image of the responsive images, is ranked as most relevant to the query.

A fourth example is the method of the first example, wherein the identifying the images from the auxiliary content that are each visually similar to the first image is further performed with reference to metadata of the auxiliary content.

A fifth example is the method of the fourth example, wherein the identifying the images from the auxiliary content that are each visually similar to the first image is further performed with reference to a geographic location of a user submitting the search query.

A sixth example is the method of the first example, further comprising the steps of: receiving the auxiliary content; and providing at least some of the images from the auxiliary content to existing image processing that was utilized to process the images that were indexed; wherein visual similarity is based on the existing image processing.

A seventh example is the method of the sixth example, wherein visual similarity is based on a distance in a multi-dimensional space between a representation, in the multi-dimensional space, of the first image and representations, in the multi-dimensional space, of the images from the auxiliary content, each dimension of the multi-dimensional space being representative of an image feature.

An eighth example is the method of the first example, wherein the provided auxiliary content is visually separated from the provided responsive images by either a border enclosing the provided auxiliary content or by the provided auxiliary content being displayed on a differently colored background than the provided responsive images.

A ninth example is a computing device comprising: one or more processing units; a network interface; and one or more computer-readable media comprising computer-executable instructions which, when executed by the one or more processing units, cause the computing device to perform steps comprising: receiving a search query; identifying images that are responsive to the search query from images that were indexed by crawling network-accessible content; identifying images, from auxiliary content, that are each visually similar to a first image of the responsive images, the auxiliary content differing from the network-accessible content that was crawled; providing at least some of the responsive images as a response to the search query; and providing, also as part of the response to the search query, but displayed visually separately from the provided responsive images, at least some of the auxiliary content that comprises the identified auxiliary content images.

A tenth example is the computing device of the ninth example, wherein the one or more computer-readable media comprising further computer-executable instructions which, when executed by the one or more processing units, cause the computing device to perform further steps comprising: identifying images from the auxiliary content that are each visually similar to a second image of the responsive images, the second image differing from the first image; and providing at least some of the auxiliary content that comprises the identified auxiliary content images that were identified as being visually similar to the second image of the responsive images.

An eleventh example is the computing device of the ninth example, wherein the first image of the responsive images, is ranked as most relevant to the query.

A twelfth example is the computing device of the ninth example, wherein the images from the auxiliary content that are each visually similar to the first image is further performed with reference to metadata of the auxiliary content.

A thirteenth example is the computing device of the ninth example, wherein the identifying the images from the auxiliary content that are each visually similar to the first image is further performed with reference to a geographic location of a user submitting the search query.

A fourteenth example is the computing device of the ninth example, wherein the one or more computer-readable media comprising further computer-executable instructions which, when executed by the one or more processing units, cause the computing device to perform further steps comprising: receiving the auxiliary content; and providing at least some of the images from the auxiliary content to existing image processing that was utilized to process the images that were indexed; wherein visual similarity is based on the existing image processing.

A fifteenth example is the computing device of the fourteenth example, wherein visual similarity is based on a distance in a multi-dimensional space between a representation, in the multi-dimensional space, of the first image and representations, in the multi-dimensional space, of the images from the auxiliary content, each dimension of the multi-dimensional space being representative of an image feature.

A sixteenth example is the computing device of the ninth example, wherein the provided auxiliary content is visually separated from the provided responsive images by either a border enclosing the provided auxiliary content or by the provided auxiliary content being displayed on a differently colored background than the provided responsive images.

A seventeenth example is a graphical user interface physically generated on a physical display device communicationally coupled to a computing device, the graphical user interface comprising: a first set of images, selected from images that were indexed by crawling network-accessible content, the first set of images being responsive to a search query; auxiliary content comprising images that are visually similar to a first image of the first set of images, the auxiliary content differing from the network-accessible content that was crawled; and at least one of a border around the auxiliary content or a background on which the auxiliary content is displayed differing in color from a background on which the first set of images is displayed.

An eighteenth example is the graphical user interface of the seventeenth example, wherein visual similarity is based on a distance in a multi-dimensional space between a representation, in the multi-dimensional space, of the first image, and representations, in the multi-dimensional space, of the images from the auxiliary content, each dimension of the multi-dimensional space being representative of an image feature.

A nineteenth example is the graphical user interface of the eighteenth example, wherein the image features representing the dimensions of the multi-dimensional space are defined by a pre-existing model of a subject of at least some of the first set of images.

A twentieth example is the graphical user interface of the nineteenth example, wherein the auxiliary content comprises additional information regarding a subject of the images of which the auxiliary content is comprised.

As can be seen from the above descriptions, mechanisms for increasing user interaction performance through the presentation of task-oriented auxiliary content have been presented. In view of the many possible variations of the subject matter described herein, we claim as our invention all such embodiments as may come within the scope of the following claims and equivalents thereto.

We claim:

1. A method for increasing user interaction performance through the presentation of auxiliary content, the method comprising the steps of:
   receiving a search query;
   identifying images that are responsive to the search query from images that were indexed by crawling network-accessible content;
   identifying images, from auxiliary content, that are each visually similar to a first image of the responsive images, the auxiliary content differing from the network-accessible content that was crawled;
   providing at least some of the responsive images as a response to the search query; and
   providing, also as part of the response to the search query, but displayed visually separately from the provided responsive images, at least some of the auxiliary content that comprises the identified auxiliary content images.

2. The method of claim 1, further comprising the steps of:
   identifying images from the auxiliary content that are each visually similar to a second image of the responsive images, the second image differing from the first image; and
   providing at least some of the auxiliary content that comprises the identified auxiliary content images that were identified as being visually similar to the second image of the responsive images.

3. The method of claim 1, wherein the first image of the responsive images, is ranked as most relevant to the query.

4. The method of claim 1, wherein the identifying the images from the auxiliary content that are each visually similar to the first image is further performed with reference to metadata of the auxiliary content.

5. The method of claim 1, wherein the identifying the images from the auxiliary content that are each visually similar to the first image is further performed with reference to a geographic location of a user submitting the search query.

6. The method of claim 1, further comprising the steps of:
   receiving the auxiliary content; and
   providing at least some of the images from the auxiliary content to existing image processing that was utilized to process the images that were indexed;
   wherein visual similarity is based on the existing image processing.

7. The method of claim 6, wherein visual similarity is based on a distance in a multi-dimensional space between a representation, in the multi-dimensional space, of the first image and representations, in the multi-dimensional space, of the images from the auxiliary content, each dimension of the multi-dimensional space being representative of an image feature.

8. The method of claim 1, wherein the provided auxiliary content is visually separated from the provided responsive images by either a border enclosing the provided auxiliary content or by the provided auxiliary content being displayed on a differently colored background than the provided responsive images.

9. A computing device comprising:
   one or more processing units;
   a network interface; and
   one or more computer-readable media comprising computer-executable instructions which, when executed by the one or more processing units, cause the computing device to perform steps comprising:
      receiving a search query;
      identifying images that are responsive to the search query from images that were indexed by crawling network-accessible content;
      identifying images, from auxiliary content, that are each visually similar to a first image of the responsive images, the auxiliary content differing from the network-accessible content that was crawled;
      providing at least some of the responsive images as a response to the search query; and
      providing, also as part of the response to the search query, but displayed visually separately from the provided responsive images, at least some of the auxiliary content that comprises the identified auxiliary content images.

10. The computing device of claim 9, wherein the one or more computer-readable media comprising further computer-executable instructions which, when executed by the one or more processing units, cause the computing device to perform further steps comprising:
   identifying images from the auxiliary content that are each visually similar to a second image of the responsive images, the second image differing from the first image; and providing at least some of the auxiliary content that comprises the identified auxiliary content images that were identified as being visually similar to the second image of the responsive images.

11. The computing device of claim 9, wherein the first image of the responsive images, is ranked as most relevant to the query.

12. The computing device of claim 9, wherein the images from the auxiliary content that are each visually similar to the first image is further performed with reference to metadata of the auxiliary content.

13. The computing device of claim 9, wherein the identifying the images from the auxiliary content that are each visually similar to the first image is further performed with reference to a geographic location of a user submitting the search query.

14. The computing device of claim 9, wherein the one or more computer-readable media comprising further computer-executable instructions which, when executed by the one or more processing units, cause the computing device to perform further steps comprising:
  receiving the auxiliary content; and
  providing at least some of the images from the auxiliary content to existing image processing that was utilized to process the images that were indexed;
  wherein visual similarity is based on the existing image processing.

15. The computing device of claim 14, wherein visual similarity is based on a distance in a multi-dimensional space between a representation, in the multi-dimensional space, of the first image and representations, in the multi-dimensional space, of the images from the auxiliary content, each dimension of the multi-dimensional space being representative of an image feature.

16. The computing device of claim 9, wherein the provided auxiliary content is visually separated from the provided responsive images by either a border enclosing the provided auxiliary content or by the provided auxiliary content being displayed on a differently colored background than the provided responsive images.

17. A graphical user interface physically generated on a physical display device communicationally coupled to a computing device, the graphical user interface comprising:
  a first set of images, selected from images that were indexed by crawling network-accessible content, the first set of images being responsive to a search query;
  auxiliary content comprising images that are visually similar to a first image of the first set of images, the auxiliary content differing from the network-accessible content that was crawled; and
  at least one of a border around the auxiliary content or a background on which the auxiliary content is displayed differing in color from a background on which the first set of images is displayed.

18. The graphical user interface of claim 17, wherein visual similarity is based on a distance in a multi-dimensional space between a representation, in the multi-dimensional space, of the first image, and representations, in the multi-dimensional space, of the images from the auxiliary content, each dimension of the multi-dimensional space being representative of an image feature.

19. The graphical user interface of claim 18, wherein the image features representing the dimensions of the multi-dimensional space are defined by a pre-existing model of a subject of at least some of the first set of images.

20. The computer-readable storage media of claim 19, wherein the auxiliary content comprises additional information regarding a subject of the images of which the auxiliary content is comprised.

* * * * *